Feb. 26, 1924.
J. J. RICE, JR
1,485,294
AUTOMOBILE SIGNAL CONTROL SWITCH
Filed March 1, 1922
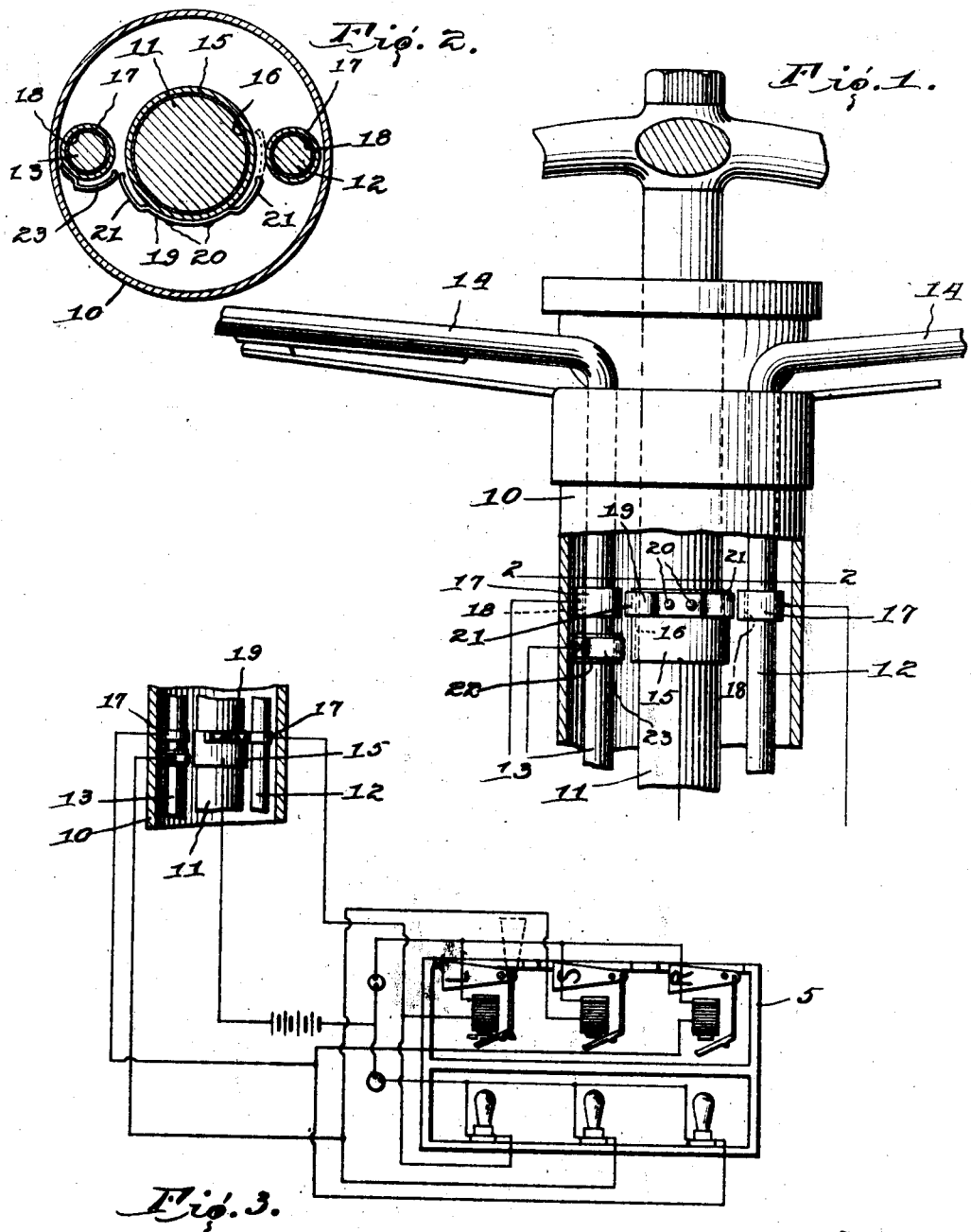
Inventor
Joseph J. Rice Jr.
By Norman T. Whitaker
his Attorney Patented Feb. 26, 1924.

1,485,294

UNITED STATES PATENT OFFICE.

JOSEPH J. RICE, JR., OF FRACKVILLE, PENNSYLVANIA.

AUTOMOBILE SIGNAL CONTROL SWITCH.

Application filed March 1, 1922. Serial No. 540,345.

*To all whom it may concern:*

Be it known that I, JOSEPH J. RICE, Jr., a citizen of the United States, and a resident of Frackville, in the county of Schuylkill and State of Pennsylvania, have invented new and useful Improvements in an Automobile Signal Control Switch, of which the following is a specification.

My invention is an electric signal control switch for motor vehicles.

The principal object of the invention is to provide an electric signal control switch which will be operated to operate signals to indicate right and left upon turning of the steering wheel and also operate a signal indicating stop upon actuating the gasoline control lever to cut off the gasoline supply to the engine.

A further object of the invention is to provide a novel switch which is associated with the steering gear and automobile control levers in such a manner as to actuate the desired signals upon actuation of the steering gear or control levers and thereby indicate to the traffic the operation the driver of the motor vehicle is about to perform.

With the preceding and other objects and advantages that may become apparent from the following description, the invention consists in the novel combination of elements, constructions and arrangement of parts and operations to be hereinafter specifically referred to, claimed and illustrated in the accompanying drawing, wherein—

Figure 1 is a fragmentary view partly in elevation and partly in cross section of an automobile steering gear control mechanism embodying the invention, Fig. 2 is a horizontal sectional view taken on line 2—2 of Fig. 1, and Fig. 3 is a diagrammatical view of the switch in circuit with a signal mechanism.

Referring in detail to the drawing wherein like characters of reference designate corresponding parts throughout the several views the numeral 5 designates a motor vehicle signal mechanism having signals to indicate "left" "right" and "stop". This signal mechanism does not constitute any part of the present invention but is merely shown to illustrate the manner in which the invention is employed.

The numeral 10 designates the usual steering column of an automobile while 11 designates the steering post. The usual spark and gasoline control rods are designated at 13 and 13' respectively and include the laterally extending operating handles 14.

Mounted on the steering post 11 and housed within the column 10 is an electricity conducting collar 15 insulated from the steering post by fibre or other insulation 16. Also mounted upon the spark and gasoline control rods are relatively small electricity conducting collars 17, the latter being insulated from the rods by an insulation 18. A circuit closer consisting of a flat strip of metal designated at 19 is riveted or otherwise secured to the collar 15 intermediate its ends as designated at 20. The extremities of this circuit closer 19 are spaced from the collar 15 and constitute resilient contacts 21 which normally lie in close proximity to the collars 17 so that upon rotation of the steering post one of the contacts 21 will engage its respective collar 17 as shown by dotted lines in Fig. 2 to close an electric circuit to the signal 5.

Fixed to the gasoline control rod 13 and disposed below the collars 17 is a similar collar 22 also insulated (not shown) from the rod 13 and fixed to this collar 22 is a resilient contact 23 adapted to engage the collar 15 upon operation of the control handle 14 of the rod 13 to cut off the gasoline supply to the engine and close an electric circuit to the signal 5 to operate the stop signal.

As shown diagrammatically in Fig. 3 the signals indicating "right" and "left" are in circuit with the collars 17 while the collar 22 is in circuit with the "stop" signal. It will thus be obvious that upon rotation of the steering post 11 to the right the circuit will be closed to operate the signal indicating "right" and reversely upon rotating the steering post to the left the signal indicating "left" will be operated. It also follows upon operating the gasoline control rod 13 to cut off the gasoline supply to the engine the contact 23 will engage the collar 15 to close the circuit through the "stop" signal to operate the latter.

It is to be understood that the form of my invention herein shown and described is to be taken as a preferred example of the same, and that various changes in the shape, size and arrangement of parts may be resorted to without departing from the spirit of the invention or the scope of the subjoined claim.

Having thus described my invention, what I claim as new and desire to secure and protect by Letters Patent of the United States is:

An automobile signal control switch comprising a steering column, a steering post and control rods therein, a collar attached to and insulated from said steering post, spring contact members attached to said collar, other collars attached to and insulated from the control rods, said latter named collars adapted to contact with the spring contact members thereby closing an electric circuit to operate a signal.

JOSEPH J. RICE, Jr.